Patented July 19, 1949

2,476,559

UNITED STATES PATENT OFFICE 2,476,559

OXAZINE DIONES

Paul Nawiasky, Summit, and Leslie Millard Schenck, Westfield, N. J., and Isaac Glenn Stevenson, Binghamton, N. Y., assignors to General Aniline & Film Corporation, New York, N. Y., a corporation of Delaware No Drawing. Application October 1, 1946, Serial No. 700,388

18 Claims. (Cl. 260—244)

This invention relates to a process of purifying aromatic 1-hydroxy-2-acid amides by converting them into aromatic oxazine diones.

It is known in three-color photography that the key image is the blue-green image generally referred to as cyan, which is produced in the red-sensitive layer. It has been the practice in the art to produce such images, particularly in color-forming development methods, by the utilization of a condensation product from an aromatic hydroxy acid and a primary aromatic amine as described in United States Patents 2,324,832 and 2,357,395. It has been observed in actual practice, that these condensation products have a tendency to impair the optical sensitizing properties of the dyes which are used in sensitizing the emulsion in the red-sensitive layer. Moreover, these condensation products do not always produce upon color development a dye image of satisfactory color density and purity. These results are due primarily to the impurities retained by the condensation products after their isolation.

It is an object of the present invention to provide a process of purifying aromatic 1-hydroxy-2-acid amides by converting them into aromatic oxazine diones.

It is a further object to purify aromatic 1-hydroxy-2-acid amides by converting them into aromatic oxazine diones and reconverting the diones to the amides by hydrolysis.

A further object is to purify aromatic 1-hydroxy-2-acid amides by converting them into aromatic oxazine diones and reconverting the diones to the amides by hydrolysis with an alkali.

A further object is to purify aromatic 1-hydroxy-2-acid amides by converting them into aromatic oxazine diones and reconverting the diones to the amides by hydrolysis with an alkali and removing the oxazine diones from the reaction mixture.

Another object of the present invention is to provide a process of purifying aromatic 1-hydroxy-2-acid amides by converting them into aromatic oxazine diones, which upon hydrolysis in an alkaline medium prior to incorporation into a silver-halide emulsion layer or in an alkaline developer, yield aromatic 1-hydroxy-2-acid amides of the highest purity.

A still further object of the present invention is new aromatic oxazine diones capable upon hydrolysis of yielding aromatic 1-hydroxy-2-acid amides.

Other objects will be apparent by reference to the following specification in which its preferred details and embodiments are described.

The above objects are accomplished by heating, in the presence of a solvent-diluent containing an acid acceptor, a compound of the following general formula:

(1)
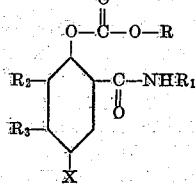

in order to effect ring closure thereof with elimination of an alcohol. In the above formula R is an alkyl group, e. g., methyl, ethyl, propyl, isopropyl, butyl, and the like, $R_1$ represents an aliphatic hydrocarbon radical of from 5 to 18 carbon atoms, e. g., alkyl such as amyl, isoamyl, hexyl, heptyl, octyl, nonyl, decyl, undecyl, dodecyl, tridecyl, tetradecyl, pentadecyl, heptadecyl, octadecyl, and the like, alkenyl such as pentenyl, hexenyl, heptenyl, octenyl, nonenyl, decenyl, undecenyl, pentadecenyl, hexadecenyl, heptadecenyl, octadecenyl, and the like, alicyclic, e. g., cyclobutyl, cyclopentyl, cyclohexyl, and the like, aryl, e. g., phenyl, naphthyl, diphenyl, etc., aralkyl, e. g., benzyl, methyl benzyl, ethyl benzyl, and the like, heterocyclic, e. g., furfuryl, pyrazolyl, and the like, $R_2$ and $R_3$ are either hydrogen, an alkyl group, as above, or the atoms necessary to complete a naphthyl or anthryl ring structure, and X represents either hydrogen, a halogen, e. g., chlorine, bromine, or iodine, or an acid radical, e. g., sulfonic, carboxylic, p-toluene sulfonic, and the like. The resulting oxazine diones are then isolated from the reaction mixture and are characterized by a structure corresponding to the general formula:

(2)
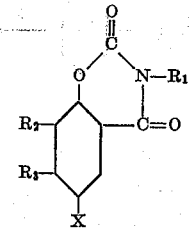

wherein $R_1$, $R_2$, $R_3$, and X have the same values as given above. These products upon hydrolysis in an alkaline solution, yield aromatic 1-hydroxy-2-acid amides of the highest purity and of the following general formula:

(3)           R'CONH—A wherein R' is a hydroxy aryl radical and A is an aliphatic radical of at least 5 carbon atoms, an aryl radical or a heterocyclic radical of the same value as $R_1$. Said aryl radical may be substituted by an acid group, at least one aliphatic straight chain hydrocarbon carrying from 5 to 18 carbon atoms, and an amino group carrying a radical capable of rendering said products fast to diffusion. Said amides have particular value when used as cyan color-formers.

According to the present invention, the aromatic oxazine diones represented by general Formula 2 can be readily prepared by a number of methods. For example, one mol of a compound of the type represented by general Formula 3 is heated with one mol of an alkyl chlorocarbonate, e. g., methyl chlorocarbonate, ethyl chlorocarbonate, n-propyl chlorocarbonate, butyl chlorocarbonate, amyl chlorocarbonate, isoamyl chlorocarbonate, and the like, in the presence of a solvent-diluent which is itself an acid acceptor or contains an acid acceptor, e. g., a tertiary nitrogenous base, such as trimethylamine, triethylamine, tributylamine, pyridine, dimethyl pyridine, ethyl pyridine, trimethyl pyridine, ethylmethyl pyridine, and propyl pyridine, or quinoline and derivatives thereof, e. g., benzoquinoline and pyridoquinoline, preferably at reflux temperature for a period of time ranging from one-half to two hours, removing the solvent-dilutent at reduced pressure in order to obtain a precipitate which is dissolved with warming in an organic solvent, i. e., an alcohol such as, methyl or ethyl alcohol. Upon cooling to room temperature, the precipitate is filtered off and recrystallized from alcohol. With 1-hydroxy-N-octadecyl-2-naphthamide-4-sulfonic acid in the form of its pyridine salt, ethyl chlorocarbonate, and pyridine as a solvent-diluent, the reactions involved may be illustrated as follows:

(a)
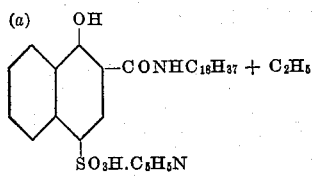

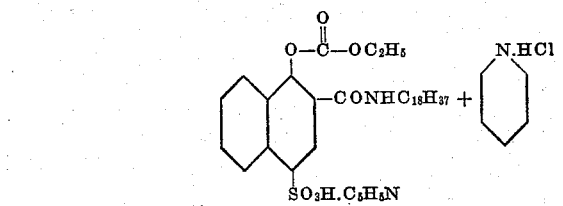

(b)
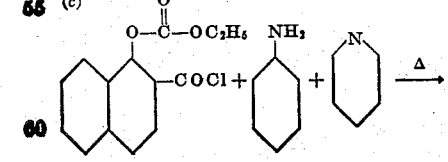

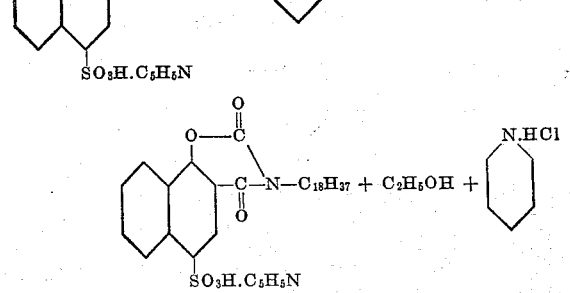

Another method consists of reacting one mol of an aromatic 1-hydroxy-2-carboxylic acid with one mol of an alkyl chlorocarbonate in the presence of a solvent-diluent to obtain an aromatic 1-carbalkoxyoxy-2-carboxylic acid. The carboxylic acid group of this compound is then reacted with thionyl chloride ($SOCl_2$) so as to convert the carboxylic acid group into a carboxylic acid chloride group. One mol of the resulting aromatic 1-carbalkoxyoxy-2-carboxylic acid chloride in the presence of a solvent-diluent is then reacted at a temperature ranging from 0° C. to 30° C., with an aliphatic amine of at least 5 carbon atoms, an aromatic amine or a heterocyclic amine to give a product represented by general Formula 1. At this stage of the reaction the reaction mixture is refluxed at a temperature ranging from 75° C. to 120° C., for a period of time ranging from one-half to two hours. The solvent-diluent is removed at reduced pressure in order to obtain a precipitate which is dissolved with warming in alcohol and then cooled to room temperature. After cooling, the precipitate is filtered off and recrystallized from alcohol. With 1-hydroxy-2-naphthoic acid, ethyl chlorocarbonate, thionyl chloride, aniline, and pyridine as a solvent-diluent, the series of reactions involved may be illustrated as follows:

(a)
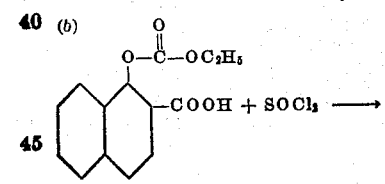

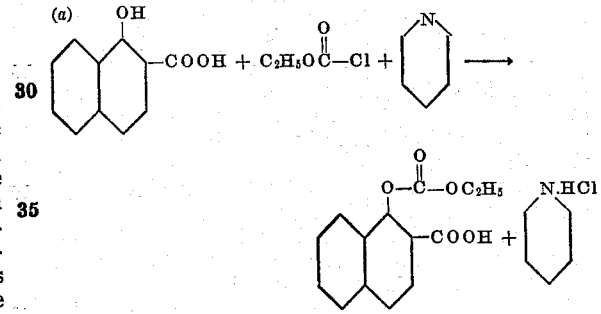

(b)
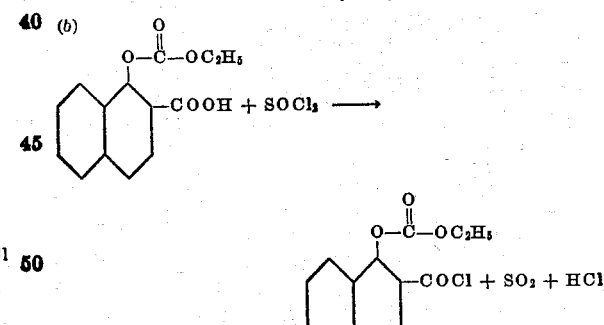

(c)
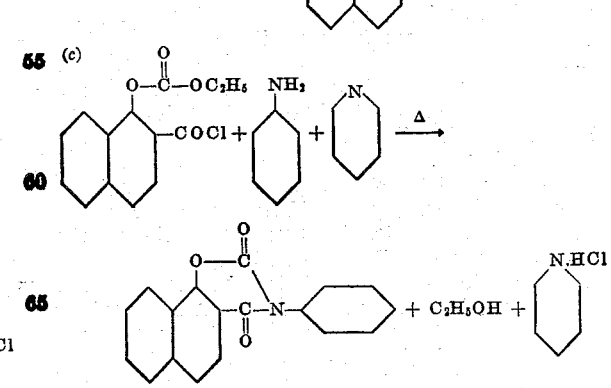

Still another method consists of reacting one mol of an aliphatic amine of at least 5 carbon atoms, an aromatic amine, or a heterocyclic amine, with one mol of an aromatic 1-hydroxy-2-carboxylic acid chloride in the presence of a solvent-diluent at a temperature ranging from 0° C. to 30° C., heating to reflux temperature for a period of time ranging from one-half to two hours and then cooling to 0° C. At this point one mol of an alkyl chlorocarbonate is added to the reaction mixture and the mixture again heated at reflux for three hours, and the solvent-diluent removed at reduced pressure. The resulting residue is then treated in the same manner as described above to yield a product represented by general Formula 2. With amyl amine, 1-hydroxy-2-naphthoic acid chloride, ethyl chlorocarbonate and pyridine as a solvent-diluent, the series of reactions involved may be illustrated as follows:

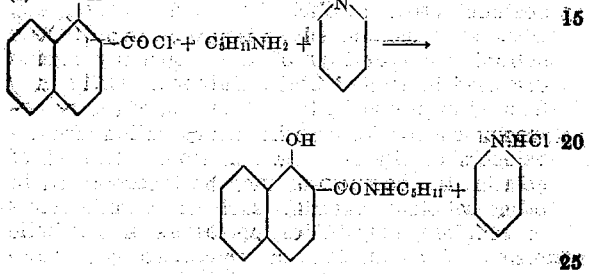

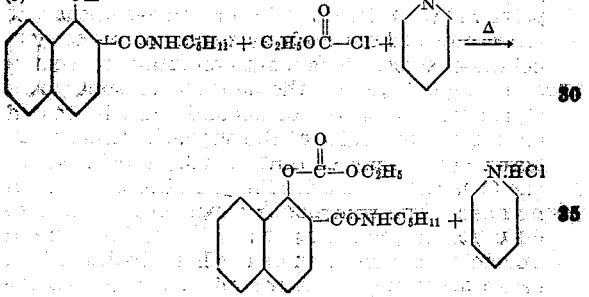

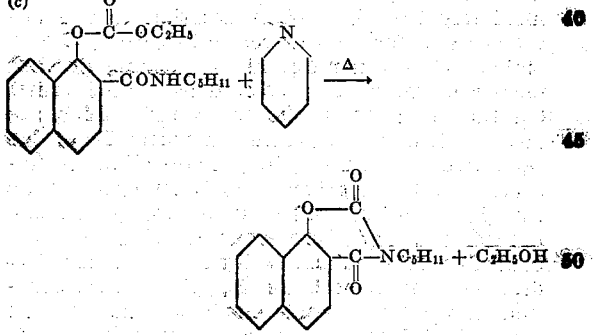

The aromatic 1-hydroxy-2-acid amides represented by general Formula 3, which may be heated with an alkyl chlorocarbonate according to the first method, are prepared according to the methods described in United States Patents 2,324,832 and 2,357,395. As specific examples of these aromatic 1-hydroxy-2-acid amides may be mentioned 1-hydroxy-N-octadecyl-2-naphthamide - 4 - sulfonic acid, α-hydroxynaphthoyl-aminododecylaniline, 1-hydroxy-2-naphthalenesulfonyl amino-4′-octadecyloxy-benzene-4-sulfonic acid, 1-hydroxy-2-naphthoyl-amino-4′-methyloctadecyl-aminobenzene-3′-sulfonic acid, 1,2,3,4-xylenocarboxylamino-4′-perhydrodiphenyl-aminobenzene-3′-carboxylic acid, 1-hydroxy-2-naphthoylamino-2′-methyloctadecylaminobenzene-5-sulfonic acid, and the like.

The aromatic 1-hydroxy-2-carboxylic acids, which may be reacted with an alkyl chlorocarbonate to form aromatic 1-carbalkoxyoxy-2-carboxylic acids, according to the second method or utilized in the preparation of the corresponding acid chlorides by treatment with PCl$_5$ in the known manner for reacting with an amine outlined in the third method are the following:

Salicyclic acid
α-Hydroxynaphthoic acid
1-hydroxy-naphthalene-2-sulfonic acid
1-hydroxy-naphthalene-6-sulfonic acid
1.2.2.4-xylenolcarboxylic acid
1-hydroxy-2-carbazolecarboxylic acid
5.6-dimethoxyphenol-2-carboxylic acid
Hydroxycinnamic acid
2.6-phenoldicarboxylic acid
1-hydroxy-6-methoxynaphthalene-2-carboxylic acid
5-hydroxyquinonoline-7-carboxylic acid The following are examples of suitable aliphatic, aromatic, and heterocyclic amines which may be used in the reactions outlined in methods 2 and 3.

Aliphatic amines

| Saturated | Unsaturated | Alicyclic |
|---|---|---|
| Amylamine | Pentenylamine | Cyclopentanylamine |
| Isoamylamine | Isopentenylamine | Cyclohexylamine |
| Hexylamine | Hexenylamine | Cycloheptylamine |
| Heptylamine | Heptenylamine | Cyclooctylamine |
| Octylamine | Octenylamine | |
| Nonylamine | Nonenylamine | |
| Decylamine | Decenylamine | |
| Undecylamine | Undecenylamine | |
| Dodecylamine | Dodecenylamine | |
| Tridecylamine | Tridecenylamine | |
| Tetradecylamine | Tetradecenylamine | |
| Pentadecylamine | Pentadecenylamine | |
| Hexadecylamine | Hexadecenylamine | |
| Heptadecylamine | Heptadecenylamine | |
| Octadecylamine | Octadecenylamine | |

Aromatic amines

Aniline
Benzylamine
α-Naphthylamine
Naphthmethylamine
ar (1)-Tetrahydro-α-naphthylamine
ac-Tetrahydro-α-naphthylamine
Toluidine
Xylidine
1-amino-2-phenylethane Aromatic amines which are substituted in o- or p-position to the amino group by an amino group carrying a radical producing fastness to diffusion and which may or may not be further substituted by an acid group in o- or p-position to the latter amino group, or those which are o- or p-diamines one amino group of which carries one or two aliphatic hydrocarbon or fatty acid radicals at least one radical of which possesses more than five carbon atoms, and which may or may not contain acid substituents in their aromatic ring, are the following:

1-amino - 4 - methyloctadecyl - aminobenzene - 3-sulfonic acid
1-amino-4-dodecyl - aminobenzene-3-carboxylic acid
1 - amino-4-abietinylaminobenzene - 3 - sulfonic acid
1 - amino-4-perhydrodiphenyl - aminobenzene-3-carboxylic acid
1 - amino-2-oleyl-aminobenzene-5-sulfonic acid
1-amino-2-abietinyl-aminobenzene-5-carboxylic acid
1-amino-2-methyloctadecyl - aminobenzene-3-carboxylic acid 1 - amino-2-dodecyl-aminobenzene - 3 - sulfonic acid
p-Stearylaminanline
o-Methyl-dodecylaminoaniline
p-Dodecylaminotoluidine
4-methyloctadecylamino-1-naphthylamine
4-methyloctadecylamino-1-aminocarbazole
4 - methyloctadecylamino-1-amino-2-ethoxybenzene
p-Stearylamino-1-methoxyaniline The last 7 compounds may be prepared by reacting the corresponding nitrochlorbenzenes with aliphatic amines. Instead of these diamines there may be employed aromatic amines, the nucleus of which has directly attached thereto by means of a homopolar linkage, i. e., —C—C—, —C—O—C—, —CONH—, —NHCO—, or —NH— linkage at least one carbon chain having more than five carbon atoms in the form of hydrocarbon radicals. Such amines are, for example, o- and p-octadecylaniline or the octadecyl ether of p-aminophenol; p-stearoylaminoaniline, p-decylcarbamylaniline, p - dodecylaminoaniline, and the like.

*Heterocyclic amines*

α-Aminofuran
β-Aminofuran
Furfurylamine
3-amino-5-pyrazolone
2-aminoindole
3-aminoindole
α-Aminopyrrole
β-Aminopyrrole
    1-phenyl-3-amino-5-pyrazolone
    1(2' - benzothiazolyl) - 3 - amino-5-pyrazolone
    6-aminobenzthiazole
    6-aminobenzoxazole Instead of a tertiary nitrogenous base as a solvent-diluent, there may be used a cyclic hydrocarbon such as, for example, cyclohexane, cycloheptane, cyclooctane, benzene, toluene, o-, m- and p-xylene, ethylbenzene, 1.2.4-trimethylbenzene, propyl-benzene, 1.3-ethyl-methylbenzene, and the like, containing an acid acceptor such as one of the nitrogenous bases hereinbefore listed, a sludge or suspension of sodium carbonate, and the like. Similarly, the solvent-diluent may be acetic acid, glacial acetic acid, or the like, containing an acid acceptor.

Of these various classes of solvent-diluents, pyridine or a pyridine-benzene mixture is preferred. It is to be noted, however, that solvent-diluents other than those mentioned above may also be employed, the selection depending more or less on the resistance of the selected solvent-diluent to reaction with the co-reactants.

In the illustrations given above, it has been stated that the oxazine diones be isolated by crystallization from an alcohol. Other methods, however, may be resorted to in order to obtain such compounds in a highly purified condition. For example, after removing the solvent-diluent, the residue is treated with sodium chloride solution, resludged in cold water, filtered, and the solid washed and dried. Or after removal of the solvent-diluent, the precipitate is sludged with acetic or glacial acetic acid, filtered, washed and dried.

It has been stated that in Formula 2 there may be an acid group such as sulfonic acid, carboxylic acid, or the like. If it be desired to isolate such oxazine diones in the form of their alkali metal salts of such acids, the oxazine dione, after removal of the solvent-diluent, is dissolved in an alcohol such as methanol, ethanol, and the like, filtered and the oxazine dione precipitated by adding a solution of an alkali metal hydroxide, i. e., sodium hydroxide, potassium hydroxide in an alcohol as above, or in aqueous alcohol.

The compounds prepared in accordance with the present invention, when employed as color-formers, may be added to the developer, provided they are not fast to diffusion in gelatin, or to the silver-halide emulsion in the form of a solution or a suspension in a suitable solvent, such as 1N-alcoholic sodium or potassium hydroxide, acetone, ethyl alcohol, isopropyl alcohol, etc. Dispersing agents such as isopropyl naphthalene sulfonic acid or any of the dispersing agents disclosed in United States Patent 2,186,717 may be used in preparing the suspension of the water-insoluble color-formers for incorporation into developers or silver-halide emulsions. Instead of gelatin, the compounds may be incorporated in other colloidal materials such as, organic esters of cellulose, polyamides, polyesters or synthetic resins. The emulsion may be carried by a transparent medium such as cellulose esters, super-polyamides, synthetic resins or a non-transparent reflecting medium such as paper, or an opaque cellulose ester. The emulsion may be coated as a single layer on the support, or superposed layers containing the compounds may be coated on one or both sides of the support. The superposed layers may be differentially sensitized for the formation of a color image in the well-known manner. The compounds which are not fast to diffusion in gelatin as where $R_1$ of the general Formula 2 is a short chain aliphatic hydrocarbon, or an aromatic or heterocyclic group not carrying a radical producing fastness to diffusion, immediately hydrolyze upon addition to the developer and form an aromatic 1-hydroxy-2-acid amide color-former capable of yielding dyestuff images of satisfactory color density and purity. On the other hand, the compounds which are fast to diffusion in gelatin as where $R_1$ of the general Formula 2 is a long chain aliphatic hydrocarbon, or an aromatic or heterocyclic group carrying a radical producing fastness to diffusion, immediately hydrolyze when dissolved or suspended in 1N-alcoholic sodium or potassium hydroxide or other basic media, prior to incorporation into a silver-halide emulsion, and form an aromatic 1-hydroxy-2-acid amide color-former of satisfactory purity.

As examples of suitable aromatic primary amino developing agents which may be employed with the color coupling compounds of the present invention, there may be mentioned p-phenylene diamine, mono ethyl-p-phenylene diamine, diethyl-o-phenylene diamine, 4,4'-diamine-diphenylamine, p-amino-dialkyl aniline, e. g., p-amino-dimethyl aniline and p-amino-diethyl aniline. These developing agents are preferably used in the form of their salts such as the hydrochloride, since they are more soluble and stable than the free base. They are characterized by the presence of a free or primary amino group in the phenyl nucleus which enables the oxidation product of the developer to couple with the color-former to form a dye image of the quinoline-imine or azomethine type in the emulsion adjacent to the individual particles of the silver image. The silver image may be removed by bleaching in the well-known manner to leave the color image in the emulsion.

A suitable developing solution is prepared as follows:

| | Grams |
|---|---|
| p-Amino-diethylaniline HCl | 2.0 |
| Sodium carbonate (anhydrous) | 50.0 |
| Sodium sulfite (anhydrous) | 2.0 |
| Potassium bromide | 0.2 |
| Water to make 1 liter. | |

The exposed silver-halide emulsions are developed in the above solution in the usual manner. A solution of the color-former is only added to the developing solution where the color-former is not fast to diffusion and is not present in the silver-halide emulsion.

The following examples are intended to illustrate the preparation of compounds of the general Formula 2. It will be appreciated that the conditions or reactions, e. g., proportion of reacting ingredients, times of reaction, and temperature, may be varied and that supplementary processes of purification, and the like, may be resorted to wherever found desirable. These and other variations and modifications will be evident to those skilled in the art in light of the guiding principles disclosed herein.

*Example I*

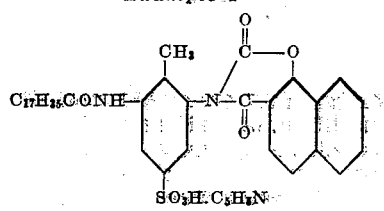

To a solution of 16.7 grams (0.356 mol) of 3-amino-5-stearoylamino-p-toluenesulfonic acid in 110 cc. of pyridine are added during a period of one-half hour at 0-10° C., 10.7 grams (0.384 mol) of 1-carbethoxyoxy-2-naphthoyl chloride. The reaction mixture is stirred an additional one-half hour at 0-10° C., one-half hour at 20-30° C., and then at reflux (115° C.) for one-half hour. The solvent is removed at reduced pressure, and the residue dissolved with warming in 56 cc. of 95% ethyl alcohol. Upon cooling, the precipitate is filtered off and recrystallized from 120 cc. of methanol, yielding 15.7 grams of crystalline product.

1.8 grams of the above color-former are dissolved in 2.0 cc. of 1N-alcoholic KOH and added with thorough mixing to 100 cc. of a gelatin silver bromide-iodide emulsion. After coating the emulsion containing the color-former onto a suitable support and drying, the film was exposed and developed to yield a cyan image of satisfactory color density and purity.

*Example II*

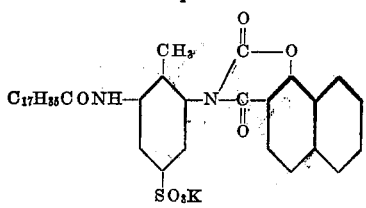

In a manner similar to that described in Example I, 16.7 grams (0.356 mol) of 3-amino-5-stearoylamino-p-toluene-sulfonic acid in 110 cc. of pyridine are reacted with 10.7 grams (0.384 mol) 1-carbethoxyoxy-2-naphthoyl chloride. The residue remaining after evaporation of the solvent is dissolved in 156 cc. of 95% ethyl alcohol and filtered to clarify. The product is precipitated by adding a solution of potassium hydroxide in 50% alcohol to pH 6.8-7.2; yield, 21 grams.

1.8 grams of the above color-former are dissolved in 2.0 cc. of 1N-alcoholic KOH and added with thorough mixing to 100 cc. of a gelatin silver bromide-iodide emulsion. After coating the emulsion containing the color-former onto a suitable support and drying, the film was exposed and developed to yield a cyan image of satisfactory color density and purity.

*Example III*

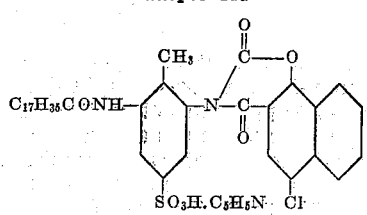

A solution of 47 grams (0.1 mol) of 3-amino-5-stearoylamino-p-toluenesulfonic acid in 350 cc. pyridine and 95 cc. of benzene is distilled at atmospheric pressure until about 100 cc. of distillate has been collected to insure dryness. There is added in one portion at 0° C. 28 grams (0.116 mol) of 4-chloro-1-hydroxy-2-naphthoyl chloride. The mixture is refluxed for three hours, and then at 0° C. 18.2 grams (0.168 mol) of ethyl chloroformate are added during one-half hour. The solution is again heated at reflux for three hours, and the solvent removed at reduced pressure. The residue is dissolved in 450 cc. hot methanol, filtered to clarify, and chilled. The produce, 71 grams, is collected by filtration, and may be recrystallized from organic solvents.

1.8 grams of the above color-former are dissolved in 2.0 cc. of 1N-alcoholic KOH and added with thorough mixing to 100 cc. of a gelatin silver bromide-iodide emulsion. After coating the emulsion containing the color-former onto a suitable support and drying, the film was exposed and developed to yield a cyan image of satisfactory color density and purity.

*Example IV*

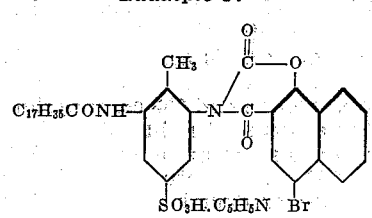

From a mixture of 47 grams (0.1 mol) of 3-amino-5-stearoylamino-p-toluenesulfonic acid in 500 cc. of benzene and 100 cc. of pyridine there are distilled 100 cc. of solvent to insure dryness. There are added at 0° C. 28.5 grams (0.1 mol) of 4-bromo-1-hydroxy-2-naphthoyl chloride. The reaction mixture is refluxed for three hours, cooled, and there are added at 0° C. during one-half hour 18.2 grams (0.168 mol) of ethyl chloroformate. Following an additional three hours at reflux temperature the solvent is removed at reduced pressure, and the cooled residue sludged with 200 cc. of methanol, filtered, and recrystallized from 1200 cc. of methanol, yielding 38.1 grams of vacuum dried product.

1.8 grams of the above color-former are dissolved in 2.0 cc. of 1N-alcoholic KOH and added with thorough mixing to 100 cc. of a gelatin silver bromide-iodide emulsion. After coating the emulsion containing the color-former onto a suitable support and drying, the film was exposed and developed to yield a cyan image of satisfactory color density and purity.

Example V

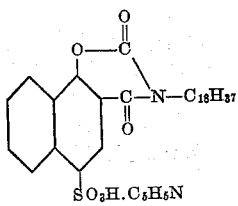

There are suspended 15.37 grams (0.025 mol) of 1-hydroxy-N-octadecyl-2-naphthamide-4-sulfonic acid as its pyridine salt in 77 cc. of pyridine. During one hour there are added at 0.5° C., 3.33 grams (0.031 mol) of ethyl chloroformate. The reaction mixture is then held at 0–5° C. for one-half hour; 30–40° C. for one-half hour; 60–70° C. for one-half hour, and at 115° C. for one-half hour. The solvent is removed at reduced pressure, and the residue emulsified at 40° C. in 128 cc. of water. The product is coagulated by pouring it into 153 cc. of 20% sodium chloride solution, filtered, and resludged in cold water, yielding 12.8 grams of vacuum dried product.

1.8 grams of the above color-former are dissolved in 2.0 cc. of 1N-alcoholic KOH and added with thorough mixing to 100 cc. of a gelatin silver bromide-iodide emulsion. After coating the emulsion containing the color-former onto a suitable support and drying, the film was exposed and developed to yield a cyan image of satisfactory color density and purity.

Example VI

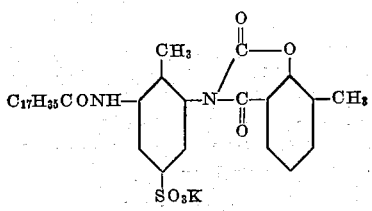

A solution of 47 grams (0.1 mol) of 3-amino-5-stearoyl-amino-p-toluenesulfonic acid in 245 cc. of pyridine at 0° C. is added to a cold solution of 36.4 grams (0.15 mol) of 2-carbethoxyoxy-3-cresotinoyl chloride and 100 cc. of pyridine. Following three hours of reflux, the solvent is removed at reduced pressure and the residue dissolved in 200 cc. of methanol. After filtration to clarify, the product is precipitated from the filtrate by adding a solution of 10 grams of potassium hydroxide in 50 cc. of 50% methanol, and 38.5 grams collected through filtration.

1.8 grams of the above color-former are dissolved in 2.0 cc. of 1N-alcoholic KOH and added with thorough mixing to 100 cc. of a gelatin silver bromide-iodide emulsion. After coating the emulsion containing the color-former onto a suitable support and drying, the film was exposed and developed to yield a cyan image of satisfactory color density and purity.

Example VII

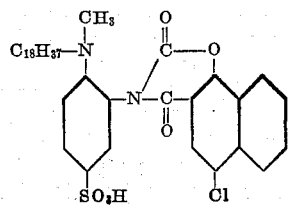

The are added at 5° C., 27 grams (0.112 mol) of 4-chloro-1-hydroxy-2-naphthoyl chloride to a suspension of 46 grams of (0.096 mol) 3-amino-4-methyloctadecylamino benzene sodium sulfonate in 500 cc. of pyridine. The mixture is slowly heated to reflux, and maintained at that temperature for one hour. Upon cooling to 5° C., there are added during one-half hour 20 grams (0.184 mol) of ethyl chloroformate, and the mixture again refluxed for one-half hour. Upon cooling to 60° C., there are added 500 cc. of methanol, the solution chilled, and 47 grams of product collected by filtration.

1.8 grams of the above color-former are dissolved in 2.0 cc. of 1N-alcoholic KOH and added with thorough mixing to 100 cc. of a gelatin silver bromide-iodide emulsion. After coating the emulsion containing the color-former onto a suitable support and drying, the film was exposed and developed to yield a cyan image of satisfactory color density and purity.

Example VIII

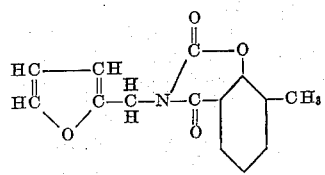

A solution of 9.7 grams (0.1 mol) of furfurylamine in 175 cc. of pyridine at 0° C., is added to a cold solution of 36 grams (0.15 mol) of 2-carbethoxyoxy-3-cresotinoyl chloride in 100 cc. of pyridine. Following three hours of reflux, the solvent is removed at reduced pressure and the residue dissolved with warming in 200 cc. of methanol. After filtration to clarify, the filtrate is cooled, the precipitate filtered off and recrystallized from methanol, yielding 25 grams of crystalline product.

One gram of the above product is dissolved in 20 cc. of ethyl alcohol. Two cc. of the solution are then added to the developing solution and used for the development of an exposed silver-halide emulsion. A cyan dyestuff image of high intensity and brilliance was obtained.

The oxazine diones of the present case are novel products and this applies particularly to those products in which the N-atom of the oxazine ring is substituted by a radical containing an aliphatic hydrocarbon chain of at least 5 carbon atoms, and the nucleus to which said ring is fused is a naphthalene nucleus. Such compounds are those which yield amides most effective as color-formers for use in silver-halide emulsions. Said compounds may be typified by the formula:

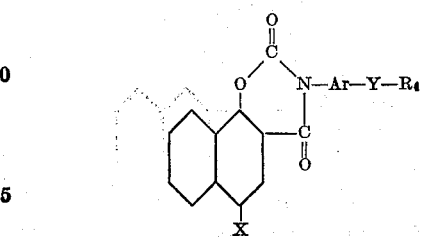

in which Ar is a phenyl radical, X is of the same value as above, Y is a homopolar linkage such as, —NH—, —CONH—, —NHCO—, —O—, and the like, and $R_4$ is an aliphatic hydrocarbon radical containing at least 5 carbon atoms.

While we have disclosed the preferred embodiments of our invention and the preferred modes of carrying the same into effect, it will be readily apparent to those skilled in the art that many variations may be made therein without departing from the spirit thereof. Accordingly, the scope of our invention is to be limited solely by the following claims.

We claim:

1. In a process of purifying amides of the formula:

wherein R' is a hydroxy aryl radical and A is a member selected from the class consisting of an aliphatic radical of at least 5 carbon atoms, aromatic and heterocyclic radicals, the improvement which comprises heating in a solvent-diluent capable of acting as an acid binding agent a compound of the following formula:

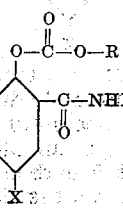

wherein R is an alkyl group, $R_1$ represents a member selected from the class consisting of an aliphatic radical of at least 5 carbon atoms, aromatic and heterocyclic radicals, $R_2$ and $R_3$ are members selected from the class consisting of hydrogen, alkyl and together the atoms necessary to complete an aryl ring structure, and X is a member selected from the class consisting of hydrogen, halogen, and an acid radical, and alkali salts of said acid radical, to effect ring closure with elimination of an alcohol, removing the solvent-diluent and recovering an oxazine dione readily convertible to said amides by alkali hydrolysis, said oxazine dione having the following general formula:

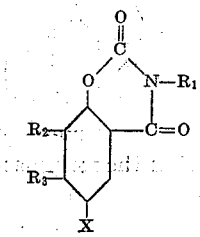

wherein $R_1$, $R_2$, $R_3$, and X have the same values as above.

2. In a process of purifying an amide of the formula:

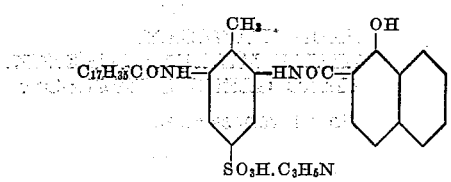

the improvement which comprises heating in a solvent-diluent capable of acting as an acid binding agent a compound of the formula:

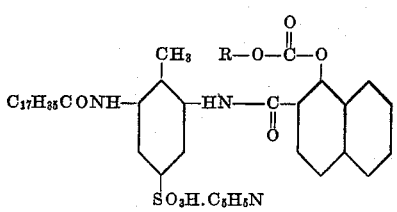

wherein R is an alkyl group, to effect ring closure with elimination of an alcohol, removing the solvent-diluent and recovering an oxazine dione readily convertible to said amide by alkali hydrolysis, said oxazine dione having the following formula:

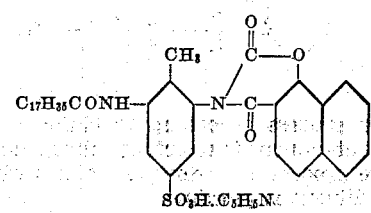

3. In a process of purifying an amide of the formula:

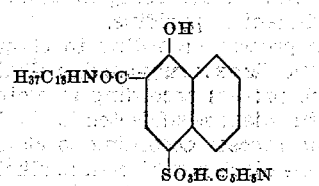

the improvement which comprises heating in a solvent-diluent capable of acting as an acid binding agent, a compound of the formula:

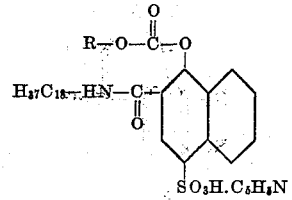

wherein R is an alkyl group, to effect ring closure with elimination of an alcohol, removing the solvent-diluent and recovering an oxazine dione readily convertible to said amide by alkali hydrolysis, said oxazine dione having the following formula:

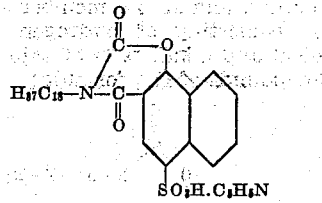

4. In a process of purifying an amide of the formula:

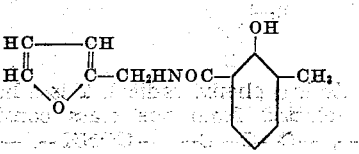

the improvement which comprises heating in a solvent-diluent capable of acting as an acid binding agent a compound of the formula:

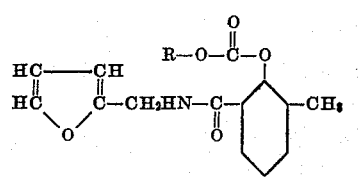

wherein R is an alkyl group, to effect ring closure with elimination of an alcohol, removing the solvent-diluent and recovering an oxazine dione readily convertible to said amide by alkali hydrolysis, said oxazine dione having the following formula:

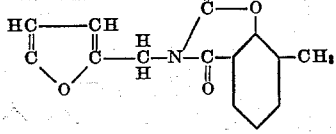

5. The process according to claim 1 wherein the solvent-diluent is a tertiary nitrogenous base.

6. The process according to claim 2 where the solvent-diluent is pyridine.

7. The process according to claim 3 where the solvent-diluent is pyridine.

8. The process according to claim 4 where the solvent-diluent is pyridine.

9. The process according to claim 1 wherein the oxazine dione is subjected to alkali hydrolysis.

10. The process according to claim 2 wherein the oxazine dione is subjected to alkali hydrolysis.

11. The process according to claim 3 wherein the oxazine dione is subjected to alkali hydrolysis.

12. The process according to claim 4 wherein the oxazine dione is subjected to alkali hydrolysis.

13. Compounds of the formula:

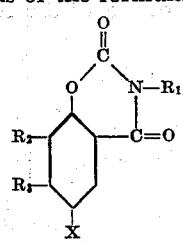

wherein $R_1$ represents a member selected from the class consisting of an aliphatic radical of at least 5 carbon atoms, aromatic and heterocyclic radicals, $R_2$ and $R_3$ are members selected from the class consisting of hydrogen, alkyl, and together the atoms necessary to complete an aryl ring structure, and X is a member selected from the class consisting of hydrogen, halogen, an acid radical and alkali salts of said acid radical.

14. Compounds of the formula:

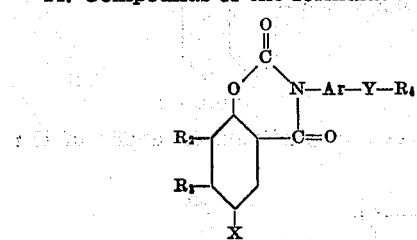

wherein Ar is a phenyl radical, Y is a homopolar linkage selected from the class consisting of —C—C—, —C—O—C—, —CONH—, —NHCO— and —NH— linkages, $R_2$ and $R_3$ are members selected from the class consisting of hydrogen, alkyl, and together the atoms necessary to complete an aryl ring structure, $R_4$ is an aliphatic hydrocarbon group of at least 5 carbon atoms, and X is a member selected from the class consisting of hydrogen, halogen, an acid radical and alkali salts of said acid radical.

15. Compounds of the formula:

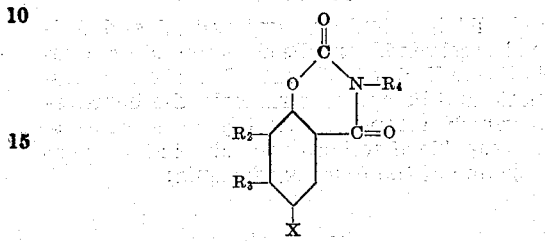

wherein $R_2$ and $R_3$ are members selected from the class consisting of hydrogen, alkyl, and together the atoms necessary to complete an aryl ring structure, $R_4$ is an aliphatic hydrocarbon group of at least 5 carbon atoms, and X is a member selected from the class consisting of hydrogen, halogen, an acid radical and alkali salts of said acid radical.

16. A compound of the formula:

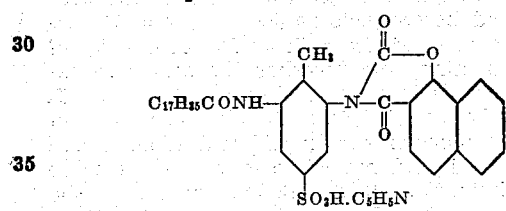

17. A compound of the formula:

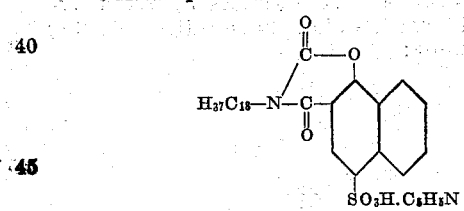

18. A compound of the formula:

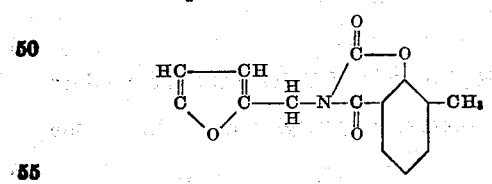

PAUL NAWIASKY.
LESLIE MILLARD SCHENCK.
ISAAC GLENN STEVENSON.

No references cited.